Dec. 5, 1950   R. POLK, SR., ET AL   2,533,139
CITRUS FRUIT JUICER

Filed Oct. 10, 1945   2 Sheets-Sheet 1

INVENTORS.
RALPH POLK, Sr. and
RALPH POLK, Jr.
BY
Hood & Hahn
ATTORNEYS.

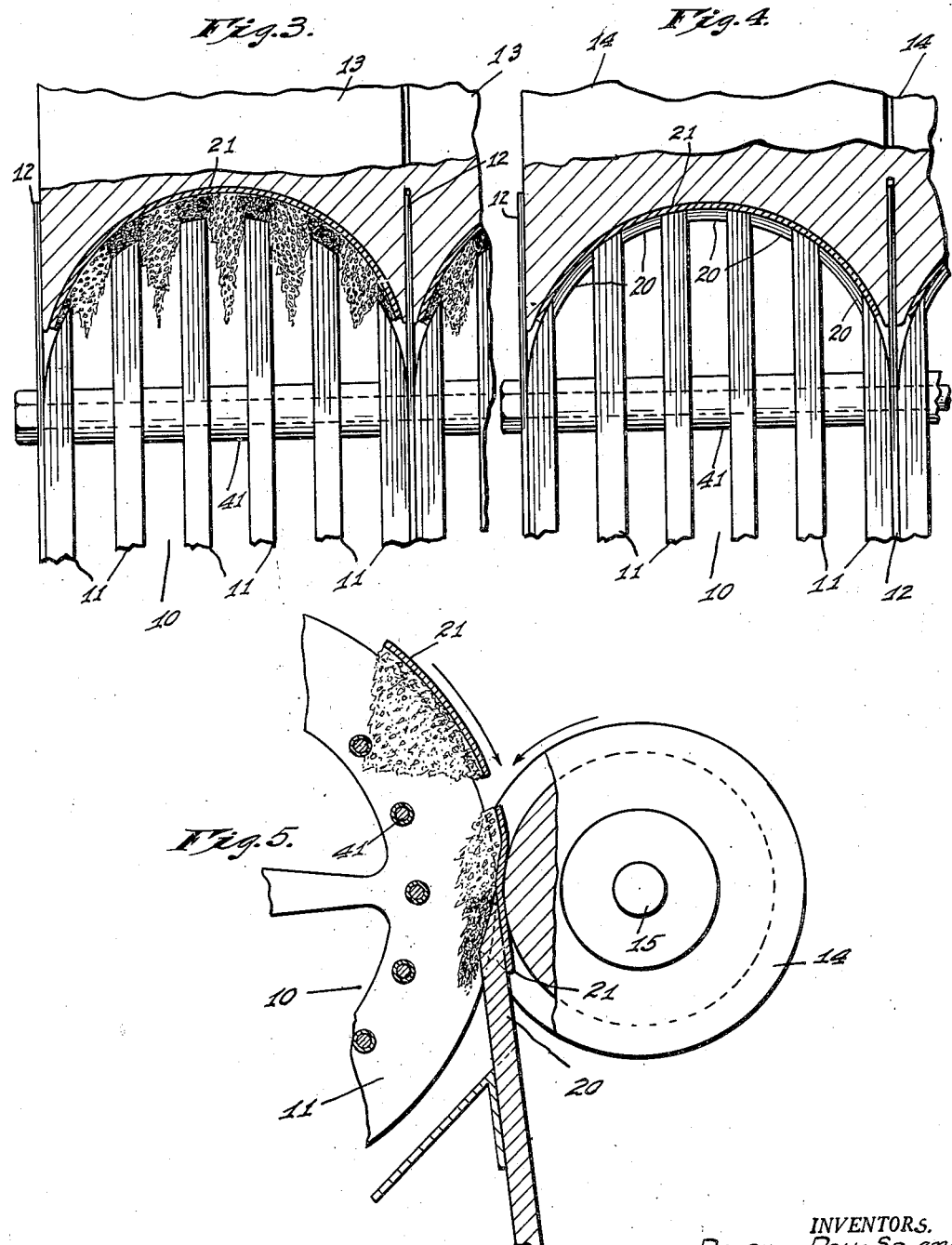

Patented Dec. 5, 1950

2,533,139

UNITED STATES PATENT OFFICE 2,533,139

CITRUS FRUIT JUICER

Ralph Polk, Sr., and Ralph Polk, Jr., Tampa, Fla., assignors to The Polk Development Company (not incorporated), Tampa, Fla., a co-partnership of Florida Application October 10, 1945, Serial No. 621,446

8 Claims. (Cl. 146—3)

The object of our invention is to provide mechanism for treating segments of citrus fruits to separate their juice and juice cells from the accompanying skins in such manner as to obtain a maximum of juice having a minimum content of skin oil.

A further object of our invention is to provide an improved method of treatment of citrus fruit segments whereby maximum juice content may be separated from the skins while subjecting the skins of the segments to a pressure substantially less than the pressure requisite to rupture the skins and encysted oil cells while at the same time avoiding distortion of the skin segments to the rupture point.

The accompanying drawings illustrate our invention.

Fig. 3 is a fragmentary section, on the scale of Fig. 2, on line B—B of Fig. 1;

Fig. 4 is a section, on the scale of Fig. 2, on line C—C of Fig. 1; and

Fig. 5 is a fragmentary elevation of the pulp-removing fingers and adjacent parts.

Figures 1, 2:
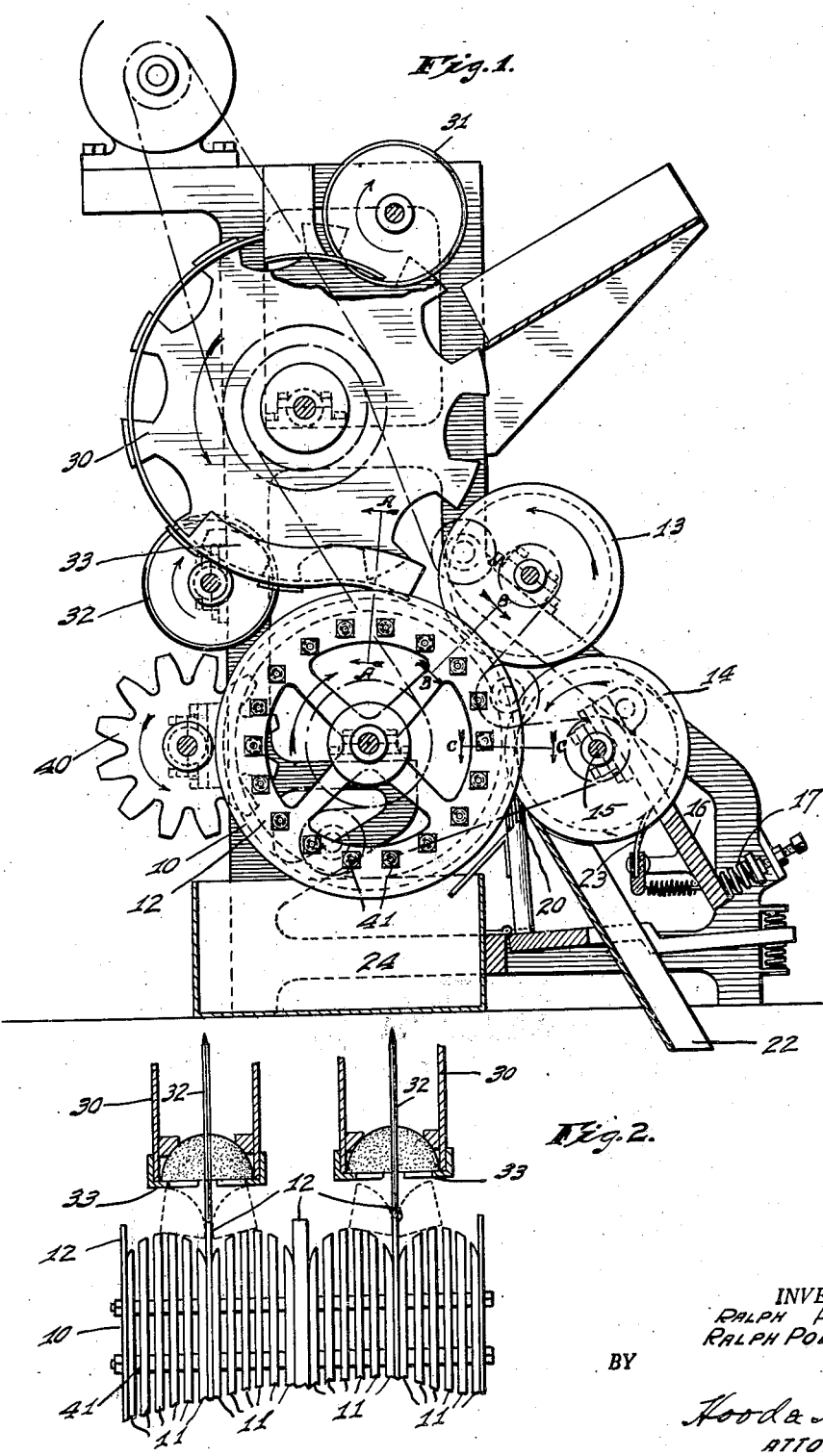
Fig. 1 is a side elevation of apparatus embodying our invention.
Fig. 2 is a fragmentary elevation and partial vertical section, on a larger scale, at A—A, Fig. 1.

In order to attain our desired ends, four fundamental conditions must be provided. The pressure exerted upon the skins must be less than the pressure which would result in rupture of the oil cells. The skins must not be distorted from their normal spherical-segment form to such an extent as to result in skin rupture. The juice content must be removed from the skins. The mechanism must be such that the fruit segments may be successfully passed through it at a rapid rate.

In the drawings 10 indicates what, for convenience, we shall call a movable grate. This grate is composed of a group of axially-spaced spoke-supported rings 11, the axial spacing of which is sufficient to provide passages through which the expressed juice and separated juice cells may pass. The peripheries of the rings 11 of each group are circumferentially so sized that in a radial section of the group the circumferences will lie in an arc having a radius approximating the radius of the largest fruit to be handled and an axial extent approximating a semi-circumference of the fruit. Flanking the smallest diameter rings 11, guard rings 12, of larger diameter, may be provided to insure retention of the fruit segments on the group of rings 11.

Mating with each group of rings 11 is a pressure roller 13 the periphery of which is axially arched to mate with the axial arc of the ring group. This roller 13 may be carried on a fixed axis so spaced from the axis of group 11 that the intervening throat is more than skin thickness and considerably less than fruit radius.

Beyond roller 13 is a second roller 14, similar to roller 13, and carried by a shaft 15 on an adjustable carrier 16 yieldingly urged toward the movable grate group 11 by a spring 17, the arrangement being such that the periphery of roller 14 may be brought to a position slightly less than skin thickness from the periphery of the grate, the effective strength of spring 17 being such that the fruit skins cannot be compressed to a point where the oil cells of the skins will be ruptured. Suitable driving means, as indicated, for rotating grate 10 and roller 13 and 14 at the same peripheral speed, with roller 13 and 14 rotating in the opposite direction to that of grate 10, is provided.

At the time that the fruit segments reach the throat between the movable grate 10 and roller 14, some of their juice cells have been crushed and burst between the grate and roller 13 while the remainder have been crowded down between the rings 11. The forwarding of the fruit segments through the throat between grate 10 and roller 13 is accomplishable without sufficient pressure to cause oil-cell rupture because both sides of the throat are moving in forwarding direction and at the same speed. As the fruit segments pass through the throat between grate 10 and roller 13 the skins are not brought fully down upon the grate but their spherical-segment form is maintained within the tensile strength of the skins so that skin rupture and oil-cell rupture is avoided.

When the fruit segments pass through the throat between grate 10 and roller 14 their skins are pressed down upon the periphery of the grate, though their spherical-segment form is substantially preserved.

At the arc of tangency of grate 10 and roller 14 the inner faces of the skins will be held firmly in contact with the arched periphery of the grate while the uncrushed juice cells will lie below, between the rings 11. We therefore project into the throat, between rings 11, a series of fingers 20 the tips of which will be substantially tangent to flanking disks at the pressure line so that, as the fruit skins 31 are firmly held between the grate and roller 14, fingers 20 will rub, scrape, or cut the juice pulp from the skins.

The juice and juice pulp flows down between rings 11 of the movable grate 10 into trough 24.

We have found, in practice that, with the form of mechanism shown, the included angle of the fruit segments should be substantially less than 180° and more conveniently 90°.

In practice, we have found that a grate wheel twenty-six inches (26") in diameter and arched on a 1⅝ radius gives very satisfactory service on orchard-run oranges. The rotational diameter may vary widely from this dimension; it may be close to fruit diameter but that produces an abrupt throat difficult to feed; and it may be very large, but it should not be so large as to flatten the skin segments beyond their rupture point. The arch radius may vary considerably; it had best be not less than smallest fruit radius and must not be such as to provide an arch so flat that skins pressed thereon will be flattened beyond rupture point.

Because a considerable volume of unburst juice-cells is pressed down between the plates of the grate wheel enough tractive effect is gained, in conjunction with skin contact by a pressure roll, that the pressure roll may be smooth, so as to avoid skin punctures, and the total pressure much lighter than that required to burst oil cells.

As previously noted, a preliminary step of fruit segmentation is essential so that a very small amount of skin oil is liberated but this amount is well within volumes permissible under Government regulations. Fruit segmentation to less than halves is preferable; quartering probably the best.

The means for exerting pressure on the inner faces of the skin surfaces must be such that the liberated juice may freely flow therefrom, instead of being trapped in pulp, and that surface must also be such that adjacent portions of pulp may be engaged and removed from the skins.

With 90° segments any suitable means for quartering the whole fruit and delivering the quarters to the grate 10 may be provided. In the drawings, we merely indicate suitable halving and quartering means such as shown in our prior Patent No. 2,309,238, comprising a bank of fruit-pocket wheels 30, a halving cutter 31 and a quartering cutter 32 with a four-way discharge chute 33 each part leading to a throat between a grid 10 and its associate roller 13.

It is possible to omit the preliminary roller 13 but we have found, in practice, that a two-stage pressing of the fruit appears to be preferable.

The relative thicknesses of rings 11 and the spaces therebetween is not critical except that the spaces should be wide enough to avoid clogging by capillary attraction on the juice and the rings should be thick enough to avoid substantial cutting into the inner faces of the skins. Figs. 2 to 4 are substantially scale drawings and indicate a workable relation of these parts.

In order to prevent clogging of pulp between rings 11 we provide star-wheels 40, the teeth of which are engaged by pins 41 of unit 10 to cause said teeth to rake the spaces between rings 11 and drive any fruit pulp inwardly beyond the inner peripheries of the ring and thus automatically keep the spaces between the rings clear at the point where fresh fruit segments are deposited.

We claim as our invention:

1. In a citrus fruit juicer, a rotary grate comprising a series of juxtaposed and axially spaced circular discs forming a grate for engaging the cut surface of fruit segments, rotary pressure means having a circular periphery for engaging the outer peel surface of the segments and arranged with respect to the peripheries of said discs to form a constricted throat, means for rotating the grate and pressure means in directions to propel the fruit segments through said throat and press pulp of the segments into the spaces between said discs, the spacing between the discs being sufficient to admit the pulp without substantial juice cell rupture thereof, and other pressure means having portions in said spaces adjacent said throat and fixed relatively to the propelled segments to engage said pulp and remove juice bearing pulp from the peel of the segments, said series of discs as a group being axially arched to form an arched grate, the diameter and arching of the grate being such that when the skins of fruit segments are pressed thereon the natural curvature of the skin will not be deformed to a skin rupture.

2. In a citrus fruit juicer, a rotary grate comprising a coaxial series of axially spaced circular spoke supported rings forming a grate for engaging the pulp surface of fruit segments, the axial spacing of said rings being sufficient to admit substantial portions of the segment pulp therebetween without substantial juice sac rupture in said portion, a movable pressure member having a surface substantially tangential to the outer peripheral surfaces of said rings and forming therewith a constricted throat, means for moving said grate and said pressure member at the throat forming position at the same surface speed and in the same direction to propel the segment skin through said throat and press said portion of pulp into the spaces between the rings, stationary fingers projected into the spaces between said rings with the tips of said fingers lying substantially tangential to the grate rings at the throat forming position with the pressure means and exerting pressure on the pulp portions in the spaces between the rings to remove juice and pulp portions from the skin as the same is propelled through said throat, and a second pressure member substantially tangential with the grate and forming therewith a second constricted throat spaced from the first throat and prior thereto in the direction of movement of the surface of the grate, the surface of said second pressure member being likewise moved at the throat forming position in the same direction and the same surface speed as the grate, and the second named throat being wider than the first named throat.

3. In a citrus fruit juicer, a rotary grate comprising a coaxial series of axially spaced circular spoke supported rings forming a grate for engaging the pulp surface of fruit segments, the axial spacing of said rings being sufficient to admit substantial portions of the segment pulp therebetween without substantial juice sac rupture in said portion, a movable pressure member having a surface substantially tangential to the outer peripheral surfaces of said rings and forming therewith a constricted throat, means for moving said grate and said pressure member at the throat forming position at the same surface speed and in the same direction to propel the segment skin through said throat and press said portion of pulp into the spaces between the rings, stationary fingers projected into the spaces between said rings with the tips of said fingers lying substantially tangential to the grate rings at the throat forming position with the pressure means and exerting pressure on the pulp portions in the spaces between the rings to remove juice and pulp portions from the skin as the same is propelled through said throat, the peripheral surface of the rings as a group being axially arched to form an arched grate and the surface of the pressure member at the throat forming position being concentrically arched therewith, the diameter of said arching being such that when skins of the fruit segments are pressed on the grate, the natural curvature of the skin will not be deformed beyond a limit of skin rupture.

4. In a citrus fruit juicer, a rotary grate comprising a coaxial series of axially spaced circular spoke supported rings for engaging the pulp surface of fruit segments, the axial spacing of said rings being sufficient to admit substantial portions of the segment pulp therebetween without substantial juice sac rupture, a pressure roller axially parallel with the grate and having a peripheral surface substantially tangential to the surfaces of said rings and forming therewith a constricted throat, means for rotating the grate and roller to move the respective peripheral surfaces thereof at the throat forming position in the same direction and at the same surface speed to propel the segment skin through the throat and press said pulp portions into the spaces between said rings, stationary fingers projected into the spaces between said rings with the tips of said fingers lying substantially tangential to the grate rings at the throat forming position with the pressure means, and exerting pressure on the pulp portions in the spaces between the rings to move the juice and pulp portions from the skin as the same is propelled through said throat, and a second pressure roller substantially tangential with the grate and forming therewith a second constricted throat spaced from the first throat and prior thereto in the direction of movement of the surfaces of the grate and pressure members, the surface of said second pressure member being likewise moved at the throat forming position in the same direction and the same surface speed as the grate, and the second named throat being wider than the first named throat.

5. In a citrus fruit juicer, a rotary grate comprising a coaxial series of axially spaced circular spoke supported rings for engaging the pulp surface of fruit segments, the axial spacing of said rings being sufficient to admit substantial portions of the segment pulp therebetween without substantial juice sac rupture, a pressure roller axially parallel with the grate and having a peripheral surface substantially tangential to the surfaces of said rings and forming therewith a constricted throat, means for rotating the grate and roller to move the respective peripheral surfaces thereof at the throat forming position in the same direction and at the same surface speed to propel the segment skin through the throat and press said pulp portions into the spaces between said rings, stationary fingers projected into the spaces between said rings with the tips of said fingers lying substantially tangential to the grate rings at the throat forming position with the pressure means and exerting pressure on the pulp portions in the spaces between the rings to move the juice and pulp portions from the skin as the same is propelled through said throat, the peripheral surfaces of the rings as a group being axially arched and the peripheral surface of the roller being circumferentially grooved concentrically with the arching of said rings at said throat, the diameter of arching being such that when skins of fruit segments are pressed on the grate the natural curvature of the skin will not be deformed beyond a limit of skin rupture.

6. In a citrus fruit juicer, a rotary grate comprising a series of juxtaposed and axially spaced circular discs forming a grate for engaging the cut surface of fruit segments, rotary pressure means having a circular periphery for engaging the outer peel surface of the segments and arranged with respect to the peripheries of said discs to form a constricted throat, means for rotating the grate and pressure means in directions to propel the fruit segments through said throat and press pulp of the segments into the spaces between said discs, the spacing between the discs being sufficient to admit the pulp without substantial juice cell rupture thereof, said discs having width at the peripheries thereof sufficient to avoid substantial cutting into the peel of the segments, and other pressure means having portions in said spaces adjacent the throat and fixed relatively to the propelled segments to engage said pulp and remove the juice bearing pulp from the peel of the segments, said series of discs as a group being axially arched to form an arched grate, the diameter and arching of the grate being such that when the skins of fruit segments are pressed thereon the natural curvature of the skin will not be deformed to a skin rupture.

7. In a citrus fruit juicer, a rotary grate comprising a coaxial series of axially spaced circular spoke supported rings forming a grate for engaging the pulp surface of fruit segments, the axial spacing of said rings being sufficient to admit substantial portions of the segment pulp therebetween without substantial juice sac rupture in said portion, a movable pressure member having a surface substantially tangential to the outer peripheral surfaces of said rings and forming therewith a constricted throat, means for moving said grate and said pressure member at the throat forming position at the same surface speed and in the same direction to propel the segment skin through said throat and press said portion of pulp into the spaces between the rings, stationary fingers projected into the spaces between said rings with the tips of said fingers lying substantially tangential to the grate rings at the throat forming position with the pressure means and exerting pressure on the pulp portions in the spaces between the rings to remove juice and pulp portions from the skin as the same is propelled through said throat, and a second pressure member substantially tangential with the grate and forming therewith a second constricted throat spaced from the first throat and prior thereto in the direction of movement of the surface of the grate, the surface of said second pressure member being likewise moved at the throat forming position in the same direction and the same surface speed as the grate, and the second named throat being wider than the first named throat, the peripheral surface of the rings as a group being arched to form an arched grate, the second pressure member being arched concentrically with the arching of the grate at the throat forming position of the second pressure member.

8. In a citrus fruit juicer, a rotary grate comprising a coaxial series of axially spaced circular spoke supported rings for engaging the pulp surface of fruit segments, the axial spacing of said rings being sufficient to admit substantial portions of the segment pulp therebetween without substantial juice sac rupture, a pressure roller axially parallel with the grate and having a peripheral surface substantially tangential to the surfaces of said rings and forming therewith a constricted throat, means for rotating the grate and roller to move the respective peripheral surfaces thereof at the throat forming position in the same direction and at the same surface speed to propel the segment skin through the throat and press said pulp portions into the spaces between said rings, stationary fingers projected into the spaces between said rings with the tips of said fingers lying substantially tangential to the grate rings at the throat forming position with the pressure means and exerting pressure on the pulp portions in the spaces between the rings to move the juice and pulp portions from the skin as the same is propelled through said throat, a second pressure roller substantially tangential with the grate and forming therewith a second constricted throat spaced from the first throat and prior thereto in the direction of movement of the surfaces of the grate and pressure members, the surface of said second pressure member being likewise moved at the throat forming position in the same direction and the same surface speed as the grate, and the second named throat being wider than the first named throat, the peripheral surfaces of the rings as a group being arched to form an arched grate, the second pressure member being arched concentrically with the arching of the grate at the throat forming position of the second pressure member.

RALPH POLK, Sr.
RALPH POLK, Jr.

REFERENCES CITED

The following references are of record in the file of this patent:

UNITED STATES PATENTS

| Number | Name | Date |
|---|---|---|
| 1,370,634 | Dowson | Mar. 8, 1921 |
| 2,004,056 | Pipkin | June 4, 1935 |
| 2,235,746 | Gould | Mar. 18, 1941 |
| 2,309,328 | Polk, Sr., et al. | Jan. 26, 1943 |